United States Patent [19]

Nakamura et al.

[11] Patent Number: 4,592,862

[45] Date of Patent: Jun. 3, 1986

[54] CONDUCTIVE RESIN COMPOSITION AND INFORMATION RECORD

[75] Inventors: Mutsuaki Nakamura; Kazuhira Namikawa; Toshiaki Hamaguchi; Akio Kuroda, all of Yokohama; Akio Hata; Noriki Fujii, both of Shinnanyo, all of Japan

[73] Assignees: Victor Company of Japan, Ltd., Tokuyama Sekisui Industry, Corporation Limited, both of Japan

[21] Appl. No.: 708,483

[22] Filed: Mar. 5, 1985

[30] Foreign Application Priority Data

Mar. 6, 1984 [JP] Japan ................................ 59-41439

[51] Int. Cl.$^4$ .............................................. H01B 1/06
[52] U.S. Cl. .................................... 252/511; 252/514; 524/495; 524/440; 358/342; 358/344; 369/126; 369/276
[58] Field of Search ............... 252/502, 503, 511, 514; 524/495, 496, 439, 440, 504; 523/174; 358/342, 344; 369/126, 276, 280, 288; 525/311, 317

[56] References Cited

U.S. PATENT DOCUMENTS

| 4,151,132 | 4/1979 | Khanna ................................ 252/511 |
| 4,280,941 | 7/1981 | Datta et al. ........................ 252/511 |
| 4,378,310 | 3/1983 | Datta et al. ........................ 252/511 |
| 4,416,807 | 11/1983 | Datta et al. ........................ 252/511 |
| 4,465,617 | 8/1984 | Whipple et al. ................... 252/511 |
| 4,472,295 | 9/1984 | Fox et al. ........................... 524/496 |

FOREIGN PATENT DOCUMENTS 0064816 11/1982 European Pat. Off. .
0074450 3/1983 European Pat. Off. .

*Primary Examiner*—Josephine L. Barr
*Attorney, Agent, or Firm*—Lowe, Price, LeBlanc, Becker & Shur

[57] ABSTRACT

A conductive resin composition comprising a specific type of graft polymer of vinyl chloride and a vinyl chloride/acrylic ester copolymer, and a conductive powder used in an amount of from 10 to 30 wt % of the graft polymer. The conductive composition is particularly useful as video or digital audio discs.

10 Claims, No Drawings

CONDUCTIVE RESIN COMPOSITION AND INFORMATION RECORD

BACKGROUND OF THE INVENTION

1. Field of the Invention

This invention relates to conductive resin compositions and also to information records using such compositions. The conductive resin compositions are particularly suitable for use as information records such as video discs or digital audio discs but may be effectively utilized in other fields such as packaging. Only for convenience' sake, the compositions may be chiefly described with reference to information records.

2. Description of the Prior Art

Information playback systems of an electrostatic capacitance type are known in the art, in which signal information is recorded as geometric variations or pits in a spiral plane or groove, or in concentric planes or grooves of an information record. The record is reproduced by scanning it with a pickup stylus, such as of diamond, having an electrode thereon along the record track, whereupon capacitive variations are established between the pickup stylus and the record according to the geometric variations in the plane or groove and are then converted back to, for example, video information suitable for display by a television receiver.

Typical of the known information records used in the above type of electrostatic capacitance playback system is a record which has geometric variations press-molded according to intended signal information, on which an electrode formed on the surface of the record. The electrode can form an electrostatic capacitance in association with the stylus electrode. In practice, the record substrate is covered with a thin metallic film electrode of several hundreds angstrom in thickness and a several hundred angstrom thick dielectric layer overlying the metallic film electrode. The dielectric layer prevents short circuiting of the electrodes and increases the dielectric constant between the electrodes. The record of this type needs a number of fabricating steps including a step of press molding a record substrate, steps of depositing the thin metallic film and the dielectric film, and the like. Thus, the fabrication is complicated and troublesome with the need of a relatively large-scale manufacturing apparatus. Thus, fabrication costs become very high.

Another type of known information record of the electrostatic capacitance type is a record which is obtained from conductive plastic compositions. The conductive plastic compositions are mixtures of thermoplastic resins, conductive materials, and other additives. Thermoplastic resins used for these purposes are, for example, vinyl chloride resins, vinyl chloride-vinyl acetate copolymers, vinyl chloride-ethylene copolymers, vinyl chloride-propylene copolymers, vinyl chloride-alkyl acrylate copolymers, vinyl chloride-acrylonitrile-styrene copolymers, graft copolymers of vinyl chloride to ethylene-vinyl acetate copolymers, vinyl chloride-alpha-olefin copolymers, vinyl chloride-vinyl alcohol copolymers, and the like. The additives may include: metallic soaps such as calcium stearate; organic tin stabilizers; lubricants such as higher alcohols, higher fatty acids, fatty acid esters, esters of polysaccharides, and the like; lubricating oils such as dimethylpolysiloxane; and the like. A typical conductive material is carbon black, which is used in amounts necessary for the electrostatic capacitance playback systems. Carbon blacks useful for these purposes may be commercially available, for example, under designations of Ketjen Black from Akzo Cheme Co., Ltd., CSX-150A3 from Cabot Co., Ltd., and XE-2 from Phillips Petroleum Chemicals Co., Ltd. These ingredients are blended, for example, in a high speed mixer such as Henschel mixer in order that carbon black is appropriately dispersed in the resin. The resulting mixture is molten in a highly kneadable extruder and pelletized, followed by shaping the pellets in a disc pressing machine to obtain video or digital audio discs. This disc is conductive and is able to establish an electrostatic capacitance in association with the electrode of a playback stylus. The record obtained from conductive resin compositions is advantageous in that no steps of depositing a thin metallic film and a thin dielectric layer are needed. Thus, such disc can be fabricated simply at low costs.

However, in order to obtain conductive resin compositions, based on vinyl chloride resins and carbon black, which have characteristic properties necessary for the electrostatic capacitance playback systems, it is essential that carbon black be used in amounts of at least 5 to 30 wt%, preferably over about 10 wt%. When such a large amount of carbon black is used, the resulting composition ordinarily exhibits poor melt-flowability and thus poor moldability. In addition, carbon black has the tendency of impeding the thermal stability of vinyl chloride resins.

Thus, there is a demand for conductive resin compositions which are very useful as information records for use in electrostatic capacitance playback systems and which may be also used in antistatic fields such as a packaging field.

SUMMARY OF THE INVENTION

It is an object of the present invention to provide conductive resin compositions which have various good characteristic properties such as heat resistance, thermal stability, melt flowability, moldability, mechanical strength.

It is another object of the invention to provide conductive resin compositions which are very useful in forming information records and which have good processabilities such as trimming of an overflown peripheral portion and punching of a central portion after formation of the records.

It is a further object of the invention to provide conductive resin compositions which can yield information records which are rarely broken or cracked and which have a much reduced number of dropout defects.

It is a still further object of the invention to provide conductive resin compositions which are useful as antistatic articles such as packaging films.

It is another object of the invention to provide information records made of the conductive resin compositions.

According to the invention, there is provided a conductive resin composition which comprises a graft polymer obtained by graft-polymerizing 85 to 99 parts by weight of vinyl chloride and, correspondingly, 15 to 1 part by weight of a copolymer of ethylene and an acrylic ester, and a conductive powder used in an amount of from 10 to 30 wt% of the graft polymer. The conductive resin composition is particularly useful in forming an information record of an electrostatic capacitance type. The conductive powder is usually carbon black although metallic powders may be used.

DETAILED DESCRIPTION AND EMBODIMENTS OF THE INVENTION

The graft polymers useful in the present invention are products which are obtained by subjecting vinyl chloride monomer to graft-polymerization with copolymers of ethylene and acrylic esters. The ethylene/acrylic ester copolymers should preferably have from 10 to 65 wt% of acrylic ester constituent with the balance of ethylene constituent. For the graft polymerization, 99 to 85 parts by weight of vinyl chloride monomer is graft-polymerized with, correspondingly, 1 to 15 parts by weight of the copolymer.

The copolymers of ethylene and acrylic esters include various types of products, which depend on the type and content of acrylic ester, the molecular weight, and the ratio of ethylene and acrylic ester. Examples of the acrylic esters include methyl acrylate, ethyl acrylate, 2-methylhexyl acrylate, and the like. These esters may be used singly or in combination. The acrylic ester is generally used in an amount defined above. Less amounts are unfavorable because of the poor dissolution of the resulting copolymer in vinyl chloride monomer. This results in graft polymers which are not uniform in quality. On the other hand, greater amounts result in a lowering of mechanical strength. Accordingly, the content of acrylic esters is in the range from 10 to 65 wt%, preferably from 10 to 50 wt%.

The copolymers have higher strength at higher molecular weight, and the molecular weight should preferably be in the range of from 1 to 250 when determined according to the method prescribed in ASTM D1238.

The copolymers of ethylene and acrylic ester may be prepared by various known processes and particularly, by a process similar to the process of producing high-pressure polyethylene.

For the graft polymerization reaction between vinyl chloride and the copolymer, several processes may be adopted, including emulsion polymerization, suspension polymerization, solution polymerization, bulk polymerization, and the like. Preferably, the suspension polymerization process is used because the graft polymer obtained is in the form of fine particles, which allow uniform mixing with a conductive powder such as carbon black.

More particularly, the graft polymer may be obtained by the following procedure. Ion-exchanged water, a suspension stabilizer such as polyvinyl alcohol, a radical polymerization initiator, and, if necessary, a depressant for degree of polymerization are charged into a jacketed polymerization reactor. Subsequently, an ethylene/acrylic ester copolymer is placed in the reactor and suspended, followed by evacuating the air and charging vinyl chloride under pressure. The reactor is heated to dissolve the copolymer in vinyl chloride, whereupon the graft polymerization starts. The graft polymerization proceeds exothermically. Accordingly, the reactor is cooled through the jacket and the polymerization is caused to proceed to a desired extent, after which unreacted vinyl chloride is recovered, thereby obtaining a slurry of the graft polymer. This slurry is dehydrated, dried and passed through a sifter to obtain fine particles of the graft polymer.

For the graft polymerization, use of vinyl chloride monomer alone is described above, but other monomers may be graft-polymerized with the copolymer along with vinyl chloride monomer. However, other monomers should be used in amounts not greater than 10 wt% of vinyl chloride monomer used. Examples of such monomers include ethylene, propylene, vinyl acetate, and the like.

The graft polymer useful in the present invention is preferred to have a suitable range of degree of polymerization. This is because when the degree of polymerization is too high, the melt flowability becomes poor. On the other hand, when the degree of polymerization is too low, the polymer has poor impact and heat resistances. Accordingly, the degree of polymerization is generally in the range of from 300 to 550, within which it becomes possible to add a conductive powder such as carbon black in relatively large amounts sufficient to impart a desired level of electric conductivity to resin compositions, particularly useful as information records. In this connection, however, if conductive resin compositions are used for antistatic packaging purposes in which a conductive powder is used in relatively small amounts within the defined range, the degree of polymerization may be up to 700.

The graft polymer thus obtained is mixed and kneaded with a conductive powder such as carbon black to obtain a conductive resin composition. For this purpose, any ordinary mixers may be used for kneading. However, carbon black and similar conductive powder have usually a small bulk density and are liable to coagulate, so that it is necessary to knead the mixture sufficiently so as to disperse the powder uniformly. In this sense, it is convenient to use a mixer capable of yielding high shearing energy, such as Henschel mixer, or to use fine conductive particles having a size below 0.044 mm and add the particles portion by portion. The conductive powder should be added in an amount of from 10 to 30 wt% of the graft polymer. The conductive powder is typically carbon black whose size is preferably below 0.044 mm. Powders of metals such as Au, Pt, Al and the like may be also used if desired.

Especially, when the conductive resin composition is used to form information records, additives other than a conductive powder may be added to the composition, if necessary. The additives may include stabilizers, lubricants, lubricating oils, and the like as is ordinarily used in the record art.

Apart from the additives, resins serving to improve the impact resistance of vinyl chloride resins may be added, including methyl methacrylate-styrene-butadiene copolymers, chlorinated polyethylene, and the like. For improving thermal stability, other types of resins such as so-called functional polymers available under the designations of Teralloy from Kanegafuchi Chem. Ind. Co., Ltd., PN resin Shoa Denko Co., Ltd., and the like. These resins may be used singly or in combination and are used in total amounts of 20 wt% or below, preferably 10 wt% or below, of the graft polymer.

The present invention is particularly described by way of examples.

PREPARATORY EXAMPLE

Preparation of Graft Polymer of Vinyl Chloride and Ethylene/Acrylic Ester Copolymer Ion-exchanged water, a polyvinyl alcohol (Poval) dispersant, a organic peroxide radical polymerization initiator, and an ethylene/acrylic ester copolymer were charged in a 160 liter jacketed reactor equipped with an agitator and capable of withstanding a pressure up to 60 kg/cm$^2$.G. The reactor was tightly closed, from which air was evacuated, followed by charging vinyl chloride with or without addition of other monomer to start suspension polymerization.

After completion of the polymerization, unreacted monomer was removed and recovered, followed by dehydration, drying, and passing through a 32 mesh screen to obtain fine particles of a graft polymer.

The thus obtained graft polymers had characteristics shown in Table 1 below.

TABLE 1

| | Composition of Graft Polymer (wt %) | | | Degree of Polymerization (determined by JIS K 6721) |
|---|---|---|---|---|
| No. | Type and Amount of Copolymer | Amount of vinyl chloride | Amount of monomer other than vinyl chloride | |
| 1 | A-703, 5 | 95 | — | 450 |
| 2 | A-708, 5 | 95 | — | 450 |
| 3 | A-708, 10 | 90 | — | 450 |
| 4 | A-708, 4 | 94 | ethylene, 2 | 450 |

Note
A-703: Ethylene/ethyl acrylate copolymer available from Mitsui Polychemical Co. Ltd., and having a content of ethyl acrylate of 25 wt % and a melt index of 5.

A-708: Ethylene/ethyl acrylate copolymer available from Mitsui Polychemical Co. Ltd., and having a content of ethyl acrylate of 40 wt% and a melt index of 7.

EXAMPLES 1-4

One hundred parts by weight of each of the graft polymer Nos. 1 through 4 indicated in Table 1, 5 parts by weight of dibutyltin mercapto stabilizer (RES-1, by Sankyo Organic Chemicals Co., Ltd.), 2.0 parts by weight of fatty acid glycerine ester (RES-210, by Riken Vitamin, Co., Ltd.), 0.5 part by weight of fatty acid alkyl ester (RES-310, by Kao Soaps, Co., Ltd.), and 1 part of dimethylpolysiloxane (RES-421, by Shinetsu Chemical Co., Ltd.) were charged into and blended in a 20 liter Henschel mixer until the temperature reached 110° C. Thereafter, the mixer was operated at a low speed so that the blend was cooled down to 70° C. To the blend was added 20 parts by weight of conductive carbon black (CSX-150A, by Cabot Co., Ltd. of U.S.A.), followed by raising the temperature to 110° C., agitating at high speed for 15 minutes, and cooling down to room temperature.

The mixture was then placed in a kneader, PR-46, available from Buss Co., Ltd., Switzerland, and pelletized. The resulting pellets were passed through a metal separator and a magnet to remove metals and metal-containing pellets, followed by press molding in a video disc press machine to obtain video discs of an electrostatic capacitance type.

COMPARATIVE EXAMPLES 1 THROUGH 3

The general procedure of Example 1 using the graft polymer No. 1 indicated in Table 1 was repeated except that there were used, instead of the polymer No. 1, vinyl chloride-ethylene copolymer, a blend of vinyl chloride homopolymer and A-708, and a graft polymer of vinyl chloride and ethylene-vinyl acetate copolymer, thereby obtaining video discs.

EXAMPLES 5 AND 6

One hundred parts by weight of each of graft polymer Nos. 1 and 2 indicated in Table 1, 1.3 parts by weight of dibutyltin mercaptide, 0.67 part of dibutyltin laurate, 1.53 parts by weight of an amide lubricant, 1.5 parts by weight of a monoglyceride lubricant, and 9 parts by weight of carbon black were provided and treated in the same manner as in Example 1 to obtain a conductive resin composition for use as antistatic packaging materials.

TESTS ON CHARACTERISTIC PROPERTIES

The same compositions as used in Examples 1 through 4 and Comparative Examples 1 through 3 were provided and kneaded by a twine roll to obtain 0.5 mm thick sheets. Each sheet was press molded between ferrotype plates to obtain a 1 mm thick, smooth sheet. In addition, a test piece for measuring heat resistance was made by press molding. These sheets and pieces were used to determine melt flowability, heat resistance, heat stability bending strength, conductivity, and moisture resistance according to the following procedures.

Melt flowability: a sheet was cut into 2 mm square pieces and placed in a Koka type flow tester which had a nozzle having a diameter of 1 mm and a length of 10 mm. The melt flowability was determined under conditions of a pressure of 150 kg/cm$^2$ and a temperature of 180° C.

Heat resistance: the sheet obtained by the press molding was subjected to measurement according to the method prescribed in ASTM 648 (weight: 18.6 kg).

Heat stability: a sheet was heated in a gear oven of 170° C. to determine a time before expanded or foamed.

Bending strength: a press-molded sheet was evaluated according to the method prescribed in ASTM D790 at a temperature of 20° C.

Impact resistance: a 1 mm thick, pressed sheet was cut into square test pieces having 2 cm in side length and evaluated according to the following method using the Du Pont impact tester.

Center of impact: ½R, Table for impact center: flat, Weight: 300 g, Height of dropping: 2.5 cm, Temperature: 20° C.

Twelve test pieces were measured and evaluated as follows.

0: not broken, 1: cracked, 2: broken but not flied apart, 3: broken and flied apart.

Electric conductivity: a 100 mm wide and 70 mm long test piece was made of a 1 mm thick pressed sheet, and polished with a sand paper at opposite sides thereof, each in a width of 10 mm, on which a silver paste paint was applied, followed by allowing to stand in a chamber of 20° C. and 50% R.H. for 24 hours. Immediately, a D.C. voltage was applied in order to determine a volume resistivity.

Moisture resistance: a 5 mm square test pieces was cut from a smooth pressed sheet and allowed to stand under conditions at 50° C. and 95% R.H. for 6 hours, followed by counting the number of abnormal foams through a microscope of 40 magnifications.

The results are shown in Table 2 below.

TABLE 2

| | Melt Flowability ($10^{-1}$ cm³/ second) | Heat Resistance (°C.) | Heat Stability (min.) | Bending Strength (Kg/cm²) | Impact Resistance | Conductivity (ohms · cm) | Moisture resistance (number of foams) |
|---|---|---|---|---|---|---|---|
| Ex. 1 | 0.8 | 70 | 120 | 460 | 1.5 | 7 | 0 |
| Ex. 2 | 0.9 | 69 | 125 | 460 | 1.4 | 7 | 0 |
| Ex. 3 | 1.8 | 64 | 130 | 400 | 0.3 | 9 | 0 |
| Ex. 4 | 1.5 | 65 | 128 | 430 | 2.0 | 8 | 0 |
| Comp. Ex. 1 | 0.5 | 66 | 110 | 410 | 2.3 | 7 | 0 |
| Comp. Ex. 2 | 1.2 | 66 | 100 | 350 | 3.0 | 5 | 0 |
| Comp. Ex. 3 | 0.7 | 62 | 110 | 440 | 2.7 | 7 | 1 |

The resin compositions of Examples 5 and 6 were similarly tested, with the results shown in Table 3.

TABLE 3

| | Melt Flowability ($10^{-1}$ cm³/ second) | Heat Resistance (°C.) | Heat Stability (min.) | Bending Strength (Kg/cm²) | Impact Resistance | Conductivity (ohms · cm) | Moisture resistance (number of foams) |
|---|---|---|---|---|---|---|---|
| Ex. 5 | 4.5 | 69 | 150 | 530 | 0.3 | $3 \times 10^3$ | 0 |
| Ex. 6 | 4.8 | 68 | 160 | 510 | 0.2 | $7 \times 10^3$ | 0 |

After press molding, the discs obtained in Examples 1 through 4 and Comparative Examples 1 through 3 were trimmed at overflown peripheral portions and punched at the central portion to determine percent defectives such as breakage and cracking. The discs of Examples 1 through 4 were found to be within 0.5% in all cases. In contrast, the percent defective was 4% for the disc of Comparative example 1 using vinyl chloride-ethylene copolymer, 3% for the disc of Comparative Example 2 using the blend of vinyl chloride homopolymer and the ethylene-acrylic ester copolymer, and 2% for the disc of Comparative Example 3 using the graft copolymer of vinyl chloride and ethylene-vinyl acetate copolymer. Thus, the discs of the present invention were superior in yield than the comparative discs.

What is claimed is:

1. A conductive resin composition which comprises a graft polymer obtained by graft-polymerizing 85 to 99 parts by weight of vinyl chloride with, correspondingly, 15 to 1 parts by weight of a copolymer of ethylene and an acrylic ester selected from methyl acrylate, ethyl acrylate and 2-ethylhexyl acrylate, and a conductive powder selected from carbon black, Au, Pt and Al and used in an amount of from 10 to 30 wt% of the graft polymer, the copolymer of ethylene and an acrylic ester including 10 to 65 wt% acrylic ester.

2. The conductive resin composition according to claim 1, wherein the graft copolymer has a degree of polymerization of from 300 to 50.

3. The conductive resin composition according to claim 1, further including a copolymerizable monomer selected from ethylene, propylene and vinyl acetate graft polymerized in an amount not greater than 10 wt% of the vinyl chloride monomer.

4. The conductive resin composition according to claim 1, wherein said conductive powder is carbon black having a size below 0.044 mm.

5. The conductive resin composition according to claim 1, further comprising up to 20 wt%, based on the graft polymer, of methyl methacrylate-styrene-butadiene copolymer or chlorinated polyethylene.

6. An information record of an electrostatic capacitance type which has signal information as geometric variations in the record, the record made of a conductive resin composition which comprises a graft polymer obtained by graft-polymerizing 85 to 99 parts by weight of vinyl chloride with, correspondingly, 15 to 1 parts by weight of a copolymer of ethylene and an acrylic ester selected from methyl acrylate, ethyl acrylate and 2-ethylhexyl acrylate, and a conductive powder selected from carbon black, Au, Pt and Al and used in an amount of from 10 to 30 wt% of the graft polymer, the copolymer of ethylene and an acrylic ester including 10 to 65 wt% acrylic ester.

7. The information record according to claim 6, wherein the graft copolymer has a degree of polymerization of from 300 to 50.

8. The information record according to claim 4, further including a copolymerizable monomer selected from ethylene, propylene and vinyl acetate graft polymerized in an amount not greater than 10 wt% of the vinyl chloride monomer.

9. The conductive resin composition according to claim 6, wherein said conductive powder is carbon black having a size below 0.044 mm.

10. The conductive resin composition according to claim 6, further comprising up to 20 wt%, based on the graft polymer, of methyl methacrylate-styrene-butadiene copolymer or chlorinated polyethylene.

* * * * *